Figure 1:
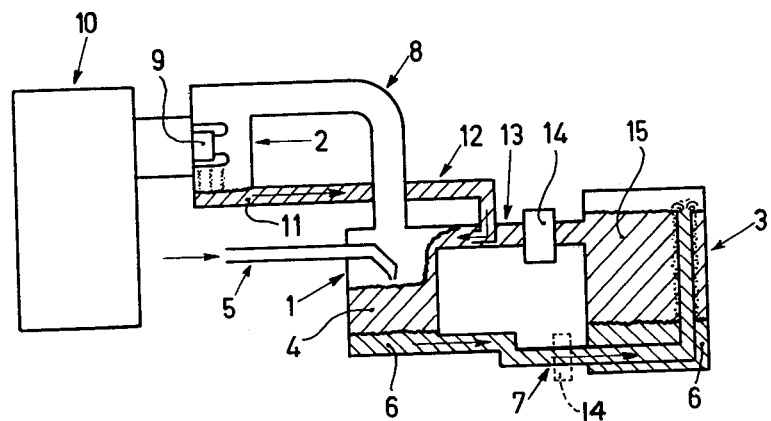

United States Patent [19]
van der Sluys

[11] 3,948,245
[45] Apr. 6, 1976

[54] COMBINED DEVICE FOR PRODUCING AND EXCHANGING HEAT WITH A HEAT CONSUMING DEVICE

[75] Inventor: van der Sluys, Eindhoven, Netherlands

[73] Assignee: U.S. Philips Corporation, New York, N.Y.

[22] Filed: Sept. 25, 1974

[21] Appl. No.: 509,141

[30] Foreign Application Priority Data
Oct. 4, 1973 Netherlands .................... 7313626

[52] U.S. Cl. .................. 126/263; 149/87; 165/105
[51] Int. Cl.² .......................... F24J 1/00; F24J 3/00
[58] Field of Search ................ 126/263, 204; 62/4; 165/105; 149/87, 109; 44/3 R

[56] References Cited
UNITED STATES PATENTS 3,075,361 1/1963 Lindberg, Jr. ........................ 62/4
3,156,595 11/1964 Camp et al. ......................... 149/87
3,325,318 6/1967 Pauliukonis .......................... 149/87
3,563,226 2/1971 Rockenfeller ....................... 126/204
3,651,797 3/1972 Schroder et al. ................... 126/263
3,662,740 5/1972 Schroder ............................. 126/263
3,690,550 9/1972 Hilberath et al. ..................... 176/39
3,811,422 5/1974 Olson ................................. 126/263

Primary Examiner—William F. O'Dea
Assistant Examiner—Ronald C. Capossela
Attorney, Agent, or Firm—Frank R. Trifari; J. David Dainow

[57] ABSTRACT

A combined heat-producing and heat-exchanging system in which sodium or a mixture of lithium and sodium and/or potassium is reacted in a reaction vessel with fluorine and/or chlorine or gaseous compounds of these halogens, while the sodium and/or potassium vapour formed as a result of the produced heat is passed on to the heat exchanger of a heat-consuming device and the condensate is led back to the reaction vessel.

6 Claims, 3 Drawing Figures

COMBINED DEVICE FOR PRODUCING AND EXCHANGING HEAT WITH A HEAT CONSUMING DEVICE

The invention relates to a device for producing heat by reacting sodium or lithium with fluorine and/or chlorine as such or in the form of a gaseous compound, provided with means for exchanging the produced heat with a heat consuming device by evaporation and condensation of sodium, potassium or mixtures of these metals, and to a method for producing and exchanging heat while using such a device.

The production of heat by means of a reaction of lithium or lithium alloys in a closed reaction vessel with a gaseous fluorine compound, such as sulphurexafluoride ($SF_6$) and gaseous or volatile fluorocarbon or fluorochlorocarbon compounds is known (U.S. Pat. No. 3,156,595 and 3,325,318).

Heat-transporting systems for exchanging heat between a heat-producing device and a heat-consuming device by evaporation and condensation of sodium, potassium or mixtures of these metals are likewise known. Such a heat-transporting system is, for example, a so-called heat-pipe in which the condensate is led back through a porous wall coating and under the influence of capillary forces to that part of the heat-pipe where evaporation takes place. It is alternatively possible to lead back the condensate under the influence of gravitation or by means of a pump to that part of the transport system which is in contact with the heat-producing device.

A restrictive factor in the transport of heat of a heat-producing device by means of a heat-transporting system to a heat-consuming device is the great thermal resistance formed by the walls of the heat-producing device such as a reaction vessel. For large outputs large wall surfaces for the transfer of heat to the heat-transporting means are required.

In practice this leads to difficulties of a constructive nature.

An object of the invention is to obviate these drawbacks by means of a device which is characterized in that it comprises a reaction vessel into which a gas can be introduced through a supply duct to a metal melt present therein, the metal vapour formed during the reaction between the gas and the metal melt as a result of the heat produced being applied through one or more ducts to a heat exchanger, while the condensate formed is led back to the reaction vessel.

The invention also relates to a method of producing heat by reacting sodium or lithium with fluorine and/or chlorine as such or in the form of a gaseous compound and exchanging the produced heat with a heat-consuming device by evaporation and condensation of sodium, potassium or mixtures of these metals. The method is characterized in that molten sodium or a mixture of lithium and sodium and/or potassium is reacted in a reaction vessel with fluorine and/or chlorine or compounds of these halogens, the sodium and/or potassium vapour formed as a result of the produced heat being led to the heat exchanger of a heat-consuming device and the condensate being led back to the reaction vessel.

As regards the use of mixtures of lithium with sodium and/or potassium the invention is based on the recognition of the fact that in case of reaction of a gaseous compound of fluorine with a metal mixture comprising lithium and sodium and/or potassium mainly lithium fluoride is formed in the first instance, because possible sodium and/or potassium fluoride formed in the melt or in the metal vapour above the melt according to $NaF + Li \rightarrow LiF+Na$ and $KF+Li \rightarrow LiF+K$ with lithium also forms lithium fluoride. The same is the case with the possibly formed sulfides of sodium and potassium which likewise react with lithium while forming lithium sulfide. Preferably the metal mixture at the initiation of the reaction comprises 15 to 30 percent by weight of sodium and/or potassium, remainder lithium. Up to approximately 1000°C the vapour above such mixtures is found to have negligible quantities of lithium. The vapour pressure above the mixture is approximately 3 times greater than might be expected according to the law of Raoult. Due to this departure from the law of Raoult a device according to the invention can operate without the temperature of the reacting metal mixture being more than approximately 150°C higher than the temperature at which the transfer of heat to the heat-consuming device is effected due to condensation. This is particularly important for use of the device according to the invention in combination with heat-consuming devices in which the transfer of heat must preferably be effected at temperatures of more than approximately 700°C, as in a Stirling engine. In this engine the output is higher as the temperature at which heat is supplied is higher.

As in the device according to the invention the temperature of the reacting metal mixture in the reaction space is generally to be chosen only 150°C higher, there are no extra problems relative to the choice of the construction materials resistant to the high temperatures to be used.

The heat-transporting system may be formed as a heat-pipe in which the pipe system for the metal vapour is coated with a porous material through which the condensate is led back to the reaction vessel under the influence of capillary forces. It is alternatively possible to utilize gravitation or a suitable pump for retransport of the condensate.

At the operating temperature of the device, which in any case is above the melting point of the salts formed during the reaction, the metals lithium and sodium and lithium potassium are sufficiently miscible.

The invention will now be further described with reference to the accompanying drawing.

FIG. 1 diagrammatically shows an embodiment in which the pipe system includes a pump.

Figures 2, 3:
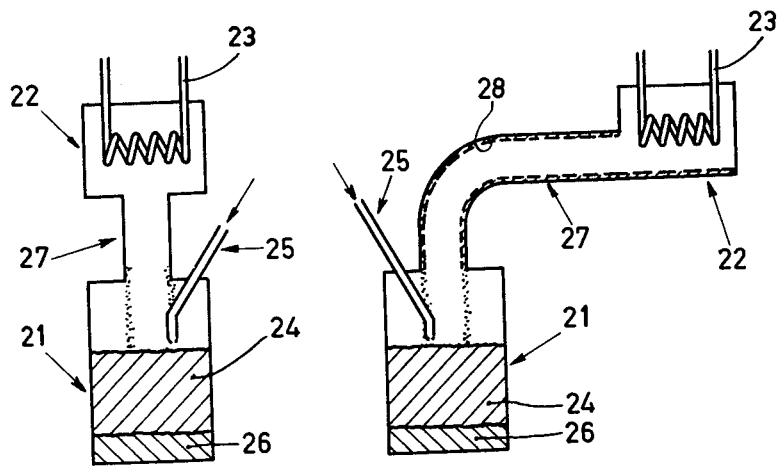

FIG. 2 diagrammatically shows an embodiment in which the condensate is led back to the metal mixture under the influence of gravitation.

FIG. 3 diagrammatically shows an embodiment using a heat-pipe construction.

The device diagrammatically shown in FIG. 1 includes a reaction vessel 1, a condensation space 2 and a combined supply and sedimentation vessel 3. The reaction vessel 1 contains a molten metal mixture 4 which in a practical embodiment comprises 80 percent by weight of lithium and 20 percent by weight of sodium. A constant stream of $SF_6$ gas is applied to the reaction vessel through the supply-duct 5. The $SF_6$ reacts in the reaction space 1 immediately with the metal mixture 4 forming substantially only lithium fluoride and lithium sulfide, which salts are substantially immiscible with the metal melt 4 and due to a higher density collect in a fluid state in the lower part of the reaction vessel 4. The fluid lithium fluoride-lithium sulfide mixture 6 flows through duct 7 to the supply and sedimentation vessel 3 in which it is stored. The sodium vapour formed during the reaction in the reaction vessel is led through the duct 8 to the condensation space 2 accommodating the heater pipes 9 of a stirling engine 10. The condensate 11 mainly consisting of sodium is passed through the duct 12 into the duct 13. An electromagnetic pump 14 surrounds the duct 13 with which pump the lithium sodium mixture 15 in the supply vessel 3 is pumped to the reaction vessel 1. The pump could alternatively be operable with the drain duct 7 or with both the drain duct 7 and the supply duct 13. At a temperaature of 900°C of the metal mixture in the reaction vessel it is found that the metal vapour pressure above the melt is 200 Torr. The temperature of the condensate 11 in the condensation space 2 is approximately 750°C. At this temperature the sodium vapour pressure is 200 Torr. These data show that the temperature in the reaction vessel need only be 150°C higher than the temperature in the condensation space to cause the device to operate. According to the law of Raoult the metal vapour pressure above the metal melt comprising 80 percent by weight of lithium and 20 percent by weight of sodium would only be 75 Torr at a temperature of 900°C.

If the contents of the reaction vessel 1 and the supply vessel 3 and the composition of the metal mixtures are chosen to be such that upon initiation of the reaction a mixture is present in the reaction vessel containing approximately 20 percent by weight of sodium and approximately 40 percent by weight at the end of the reaction, the temperature in the reaction vessel, while maintaining an equal temperature in the condensation space, can be gradually decreased to approximately 850°C by controlling the supply rate of $SF_6$.

The device according to FIG. 2 mainly consists of a reaction vessel and sedimentation space 21 and a condensation space 22 in which a heat exchanger 23 of a thermodynamic machine is present (not shown). Molten sodium 24 is present in the reaction vessel 21. Chlorine gas is applied to the reaction vessel 21 through the duct 25. The chlorine reacts in the reaction vessel 21 immediately with the sodium melt 24 forming sodium chloride which is deposited as a liquid mass 26 in the lower part of the reaction vessel 21. The sodium vapour formed during the reaction is passed through the connection duct 27 to the condensation space 22 where the vapour condenses while emitting heat to the heat exchanger 23. The condensate formed flows back through the duct 27 into the reaction vessel 21. In this embodiment the condensation temperature is only several degrees lower than the reaction temperature. The supply of chlorine is to be finished when the metal vapour pressure in the system starts to decrease with the temperature in the reaction vessel remaining the same.

The device shown in Fig. 3 does not principally differ from the device according to FIG. 2 and the same reference numerals are used. Instead of being led back under the influence of gravitation as in FIG. 2, the condensate is led back by capillary forces through the porous wall coating 28 of, for example, stainless steel wire gauze from the duct 27 to the reaction vessel 21.

The devices according to FIGS. 2 and 3 are suitable for use once, for example, in combination with the propeller mechanism of a torpedo. The devices according to the invention may be manufactured of 18-8 stainless steel. The device according to the invention particularly provides the advantage that great outputs can be exchanged between heat-producing and heat-consuming devices with relatively simple means.

What is claimed is:

1. A method of producing heat comprising the steps of reacting in a reaction vessel a molten material selected from the group consisting of Na, K, Na+K, Li+Na, Li+K, Li+Na+K, with a first gaseous material selected from the group consisting of Fl, Cl, and gaseous compounds thereof, and thereby producing a second gaseous material selected from the group consisting of gaseous Na, K, and mixtures of Na+K, and at least one liquid salt thereof, exchanging said produced-heat with a heat consuming device by flowing said second gaseous material to said device, condensing said second material on said device, and conducting the condensate back to said reaction vessel.

2. Apparatus for producing heat for use by a heat-consuming device, and operable with a first material selected from the group consisting of Na, K, Na+K, Li+Na, Li+K and Li+Na+K with a first gaseous material selected from the group consisting of Fl, Cl and gaseous compounds thereof, the apparatus comprising a reaction vessel, first supply duct means for introducing said first material into said vessel and for heating said first material to a molten state, means for introducing said first gaseous material into said vessel for reaction with said first material and production of heat and reaction products selected from the group consisting of gaseous Na, K, and mixtures and salts thereof, means for conducting said gaseous reaction products to a heat exchanger for condensation of said products on said heat exchanger and heat exchange thereto, and means for conducting said condensate back to said reaction vessel.

3. Apparatus according to claim 2 further comprising a supply and sedimentation vessel, a drain duct for communicating salts of said heat-producing reaction from said reaction vessel to said sedimentation vessel wherein a quantity of said first material is separated out of said salts, a second supply duct for communicating said condensate from said heat exchanger back to said reaction vessel, and a third supply duct for communicating said quality of said first material from said supply and sedimentation vessel to said reaction vessel.

4. Apparatus according to claim 3 further comprising a pump in at least one of said drain and supply ducts.

5. Apparatus according to claim 3 wherein said second supply duct communicates said condensate into said first supply duct means.

6. Apparatus according to claim 2 wherein for initiating the reaction in said reaction vessel, a quantity of said first material of 15–30 percent by weight of X is provided, with the remainder by weight being Li, wherein X is a component selected from the group consisting of Na, K, and Na+K.

* * * * *

UNITED STATES PATENT AND TRADEMARK OFFICE
CERTIFICATE OF CORRECTION

PATENT NO. : 3,948,245
DATED : April 6, 1976
INVENTOR(S) : WILLEM LUDOVICUS NICOLAAS VAN DER SLUYS It is certified that error appears in the above-identified patent and that said Letters Patent are hereby corrected as shown below:

IN THE TITLE PAGE; after "[75] Inventor" delete "van der Sluys"

and insert inventor's full name

--WILLEM LUDOVICUS NICOLAAS VAN DER SLUYS--

Signed and Sealed this

Thirteenth Day of July 1976

[SEAL]

Attest:

RUTH C. MASON
Attesting Officer

C. MARSHALL DANN
Commissioner of Patents and Trademarks